United States Patent

Schaedler et al.

[11] Patent Number: 5,873,225
[45] Date of Patent: Feb. 23, 1999

[54] DUCTED FAN MOWER DECK

[76] Inventors: Axel Schaedler, 7520 Cranston Ct., North Royalton, Ohio 44133; Michael Miller, 687 Redstone Cir., Brunswick, Ohio 44212

[21] Appl. No.: 424,894

[22] Filed: Apr. 19, 1995

[51] Int. Cl.[6] ............................................. A01D 34/67
[52] U.S. Cl. ............................ 56/13.3; 56/16.9; 56/320.2
[58] Field of Search .................................. 56/13.3, 13.4, 56/16.9, 320.1, 320.2, 202

[56] References Cited

U.S. PATENT DOCUMENTS

| | | | |
|---|---|---|---|
| 3,646,739 | 3/1972 | Dahl | 56/320.2 X |
| 4,087,955 | 5/1978 | Syzmanis | 56/13.4 X |
| 4,204,388 | 5/1980 | Dawson | 56/320.1 |
| 4,205,510 | 6/1980 | Raniero | 56/13.4 X |
| 4,244,164 | 1/1981 | Syzmanis | 56/320.2 X |
| 4,361,000 | 11/1982 | Friberg | 56/320.2 X |
| 4,407,112 | 10/1983 | Shepherd et al. | 56/320.2 X |
| 4,899,526 | 2/1990 | Harris | 56/320.2 |
| 5,263,305 | 11/1993 | Fassauer | 56/12.8 |
| 5,435,118 | 7/1995 | Cobile | 56/13.4 |

*Primary Examiner*—Terry Lee Melius
*Assistant Examiner*—Heather Shackelford
*Attorney, Agent, or Firm*—Emerson & Associates

[57] ABSTRACT

A mower deck is disclosed that utilizes an auxiliary source of pressurized air in order to avoid clipping buildup under the mowing deck, most particularly at the trailing edge of the discharge chute.

11 Claims, 4 Drawing Sheets

DUCTED FAN MOWER DECK

FIELD OF INVENTION

This invention relates to an improved mower deck.

BACKGROUND OF THE INVENTION

Rotary mower decks typically have a single or multiple blade which cuts vegetation by the rotation of such blades in a controlled area such as underneath a mower deck. Typically, this mower deck includes a single discharge chute which faces either to the side or, occasionally, to the rear of the associated frame which supports same for travel over the ground. These mower decks need a large volume of air in order to provide for the movement of grass clippings underneath the deck and through the discharge chute. Typically, this volume of air is provided by having the lower lip of the lower deck spaced from the ground such that the needed air can travel between the mower deck and the ground before being passed through the discharge chute. However, this distance provides for a space wherein the noise of the blades can pass to the outside world and, in addition, limits the shortest length of cut for the blades.

OBJECTS OF SUMMARY OF THE INVENTION

It is an object of this present invention to increase the efficiency of mower decks.

It is another object of the present invention to allow for increased depth of the sidewall of a mower deck.

It is yet another object to the present invention to increase the efficiency of the dispersal of grass clippings in a mower deck.

It is still another object of present invention to reduce the plugging and/or to grass build-up within the confines of the mower deck.

It is a further object of the present invention to increase the bagging efficiency of mower decks.

Other objects and more complete understanding of the invention may be had by referring to the drawings in which:

BRIEF DESCRIPTION OF THE DRAWINGS

Structure, operation, and advantages are presently disclosed preferred embodiment of the invention will become apparent when consideration of the following description taken in conjunction with the accompanying drawings wherein.

DETAILED DESCRIPTION OF THE INVENTION

Figure 1:
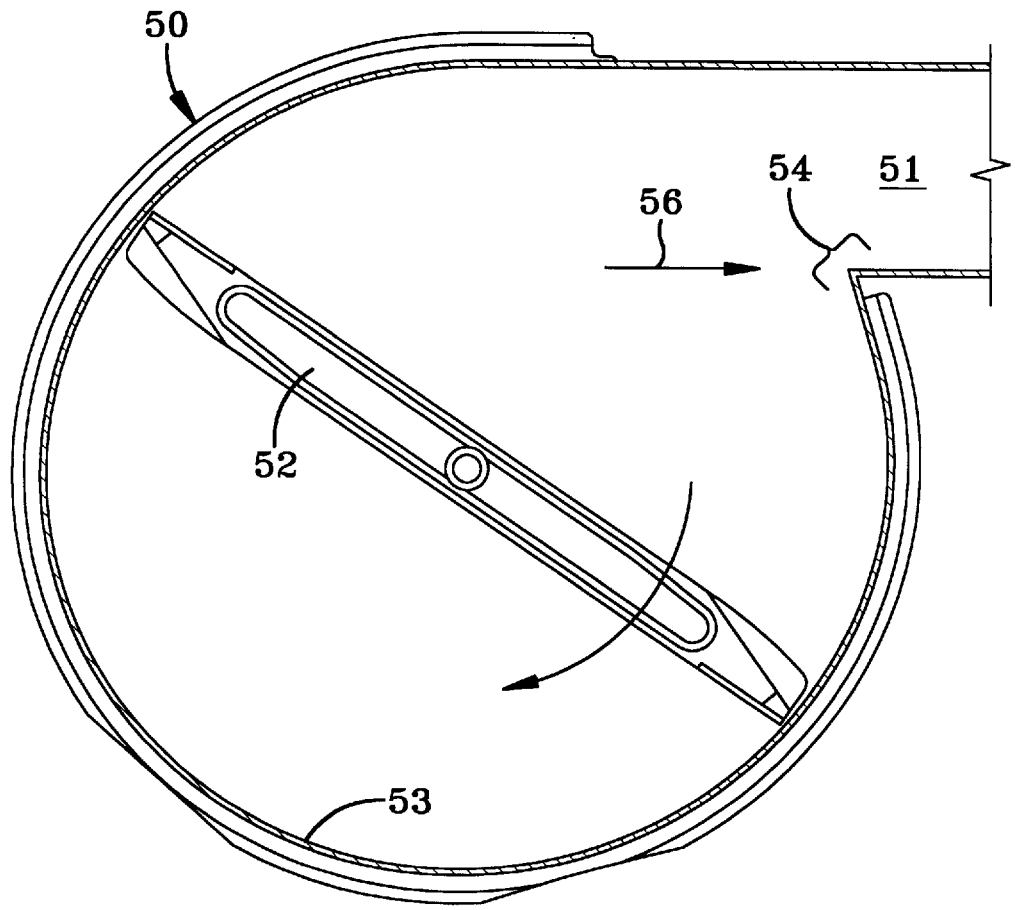
FIG. 1 is a diagram of the airflow created by the invention in a mower deck.

The invention of this application is directed to the use of high-pressure air in order to improve the cutting efficiency of rotary lawn mowers. The invention has particular application to lawn mowers having cutting decks extremely close to the ground and/or decks otherwise having a reduced volume of air passing through the deck and/or out the discharge chute. The invention will be described in an embodiment incorporating a single 30 inch blade in a rear discharge type riding lawn mower.

The invention of this application relates to incorporation of a pressure differential creating device to be associated with a mower deck 50 having a discharge chute 51 and a rotary blade 52.

In the typical mower deck, when the blade is rotated at slow speeds, operated under heavy loading conditions and/or the deck is deprived of a rapid-flow of replacement air, there is a tendency to clog or build up grass clumps throughout the confines of the mower deck; most particularly at the trailing edge 54 of the discharge chute. It is at this location that any build up is particularly troublesome because, as grass clippings build up at this location, they also reduce the cross-sectional area of the discharge chute and disrupt the laminar flow of the circulating air around the confines of the mower deck.

The present invention alleviates this problem by incorporating an additional pressure differential creating device with the mower deck, such pressure differential device increasing the pressure and velocity of air underneath the mower deck, most particularly at the trailing edge 54 of the discharge chute. This pressure differential device acts to increase the velocity of air underneath the mower deck as well as encouraging the vegetation residue to travel through the discharge chute 51 and not build up at the trailing edge 54 or elsewhere.

In the preferred embodiment, the mower deck 50 is a 30 inch singe-bladed rear discharge mower deck for use with a riding lawn mower. Although this particular deck is a single-bladed rear discharge design, it could be understood that the invention could be utilized with side-to-side multiple spindle mower decks as well as other rotary mower devices that could utilize an increase in pressure differential, most particularly at the trailing edge of a discharge chute. These mower decks may be suspended from the underneath of a riding mower, may be interconnected to the front, or may be interconnected to the back of the associated power vehicle as known in the art.

The particular mower deck 50 disclosed also includes sidewalls 53 which extend downward into the vegetation further than in ordinary mower decks. The purpose for this particular additional extension is to reduce the blade noise which escapes from underneath the mower deck 50. While advantageous, this extension of the sidewall 53 downward also has the effect of further reducing the amount of air which can be utilized by the blade otherwise used to create a high enough velocity air flow to provide for satisfactory mowing under all conditions. Particularly troublesome are wet lawns having a high blue grass or other high density concentration of grass blades.

In even a conventional deck, under these circumstances, the air flow caused by the rotary blade 52 underneath the mower deck would be disrupted, causing vegetation build-up on the trailing edge 54 of the discharge chute 51 and otherwise clogging up the laminar air flow which would preferably be present for smooth discharge. With the increased sidewalls of the present preferred embodiment the problem would otherwise be exacerbated.

The present differential pressure device remedies these problems by providing an extra source of high velocity air underneath the discharge chute and, most particularly, at the trailing edge 54 of the discharge chute 51. This pressure differential device increases the apparent velocity of air at the discharge chute, thus to increase the discharge efficiency at this critical point while also protecting the trailing edge 54 of the discharge chute against undesired residue buildup. The trailing edge 54 is the edge located where the discharge chute 51 and the sidewall 53 meet.

Figure 2:
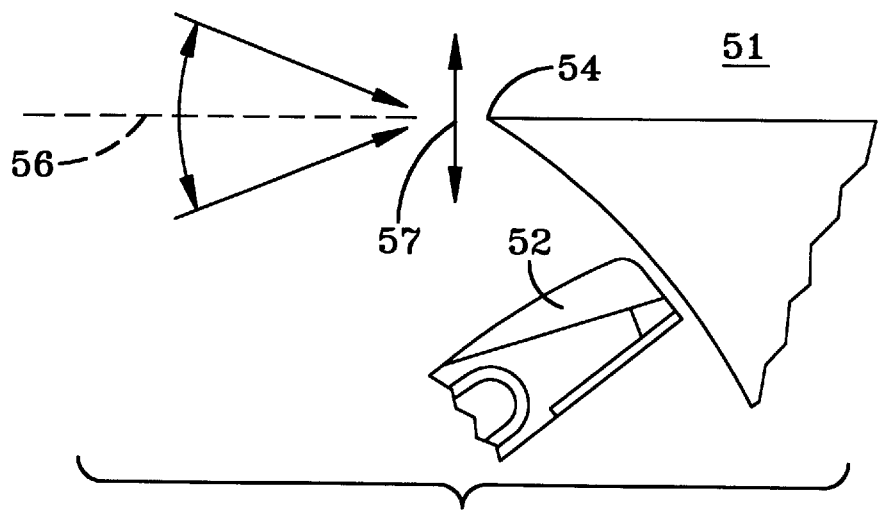
FIG. 2 is an enlarged drawing of the area of the trailing edge of the mower deck diagram of FIG. 1.
Figure 3:
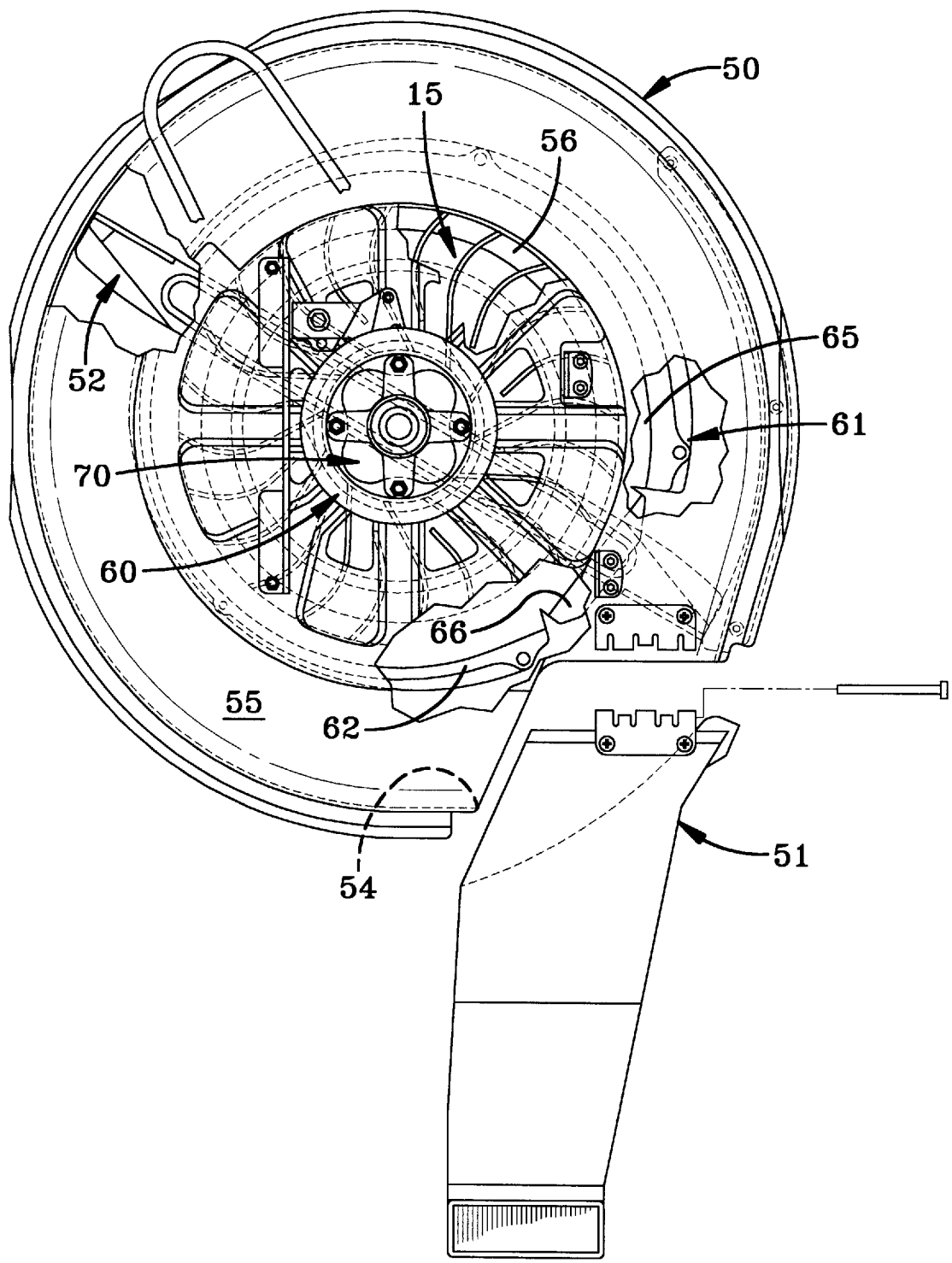
FIG. 3 is a downward-looking view of a mower deck incorporating the invention of the application.
Figure 4:
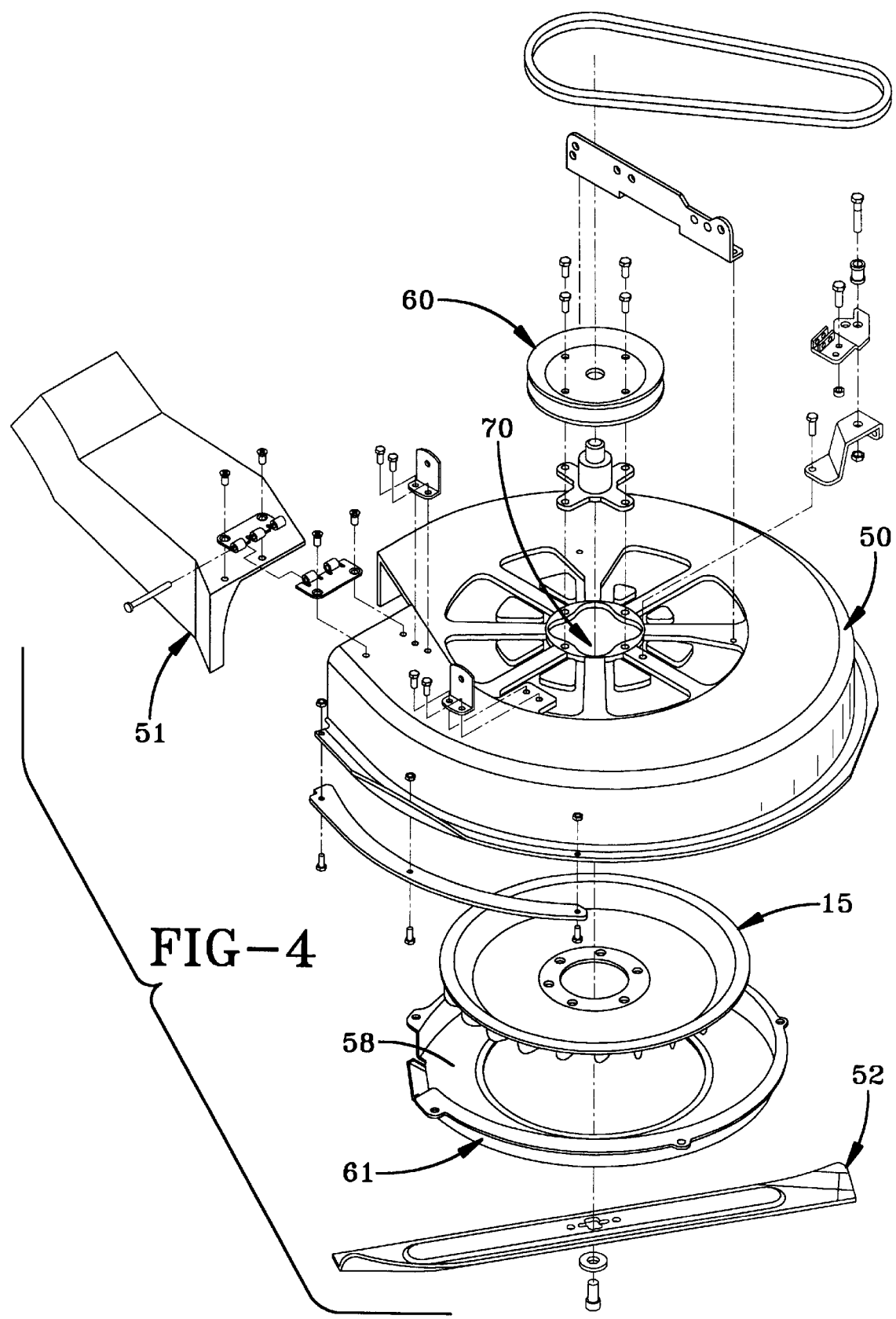
FIG. 4 is a perspective view of the mower deck of FIG. 3.
Figure 5:
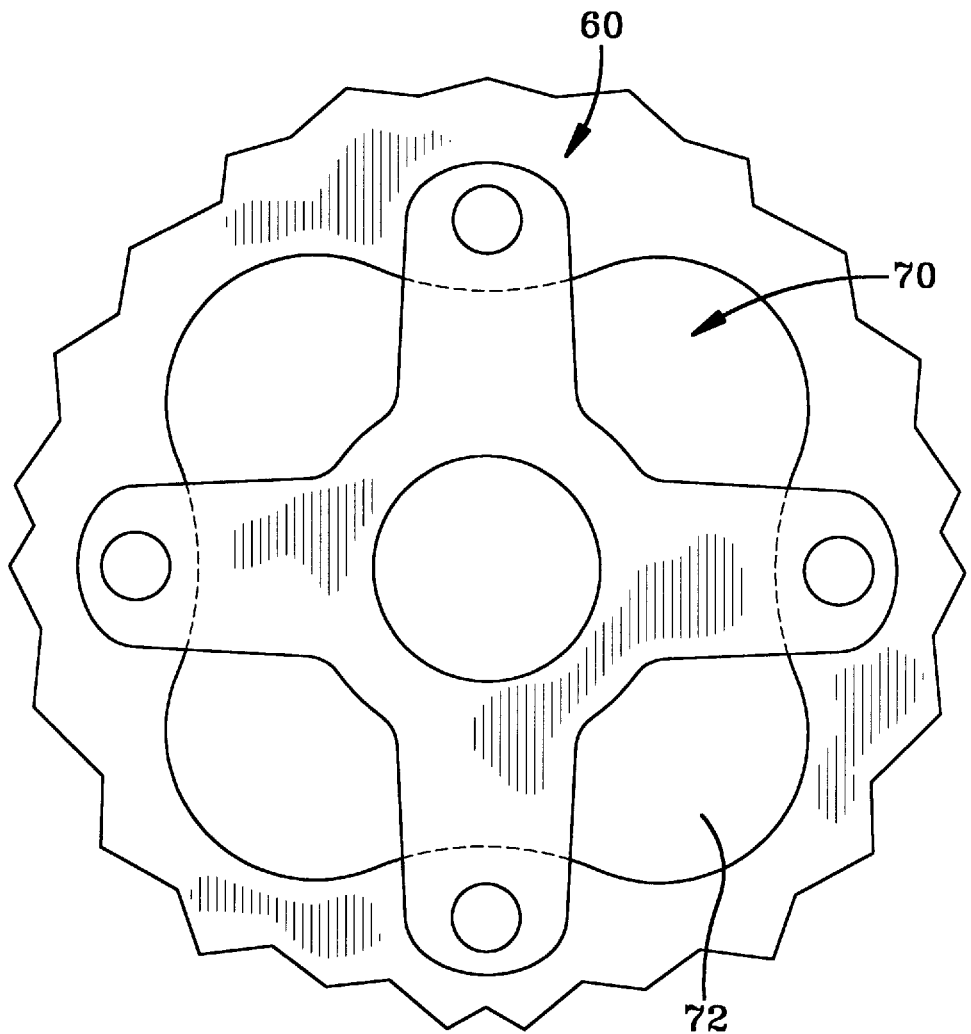
FIG. 5 is an enlargement of the area surrounding the spindle of the mower deck of FIG. 3.

As shown in FIG. 2 the direction and location of the pressurized air in respect to the trailing edge of the discharge chute can vary. The most efficient location is tangential 56 to the path of the mower blade directed straight at the trailing edge or slightly upstream thereof. This creates a relatively high pressure air stream at this location, thus encouraging the grass clippings to pass out of the discharge chute. As represented in FIG. 2, the actual location and direction of the air stream may vary. Keeping the air stream direction the same, movement radially of the center of the mower deck has a minimal additional effect on the air flow. However, angling the air flow at an angle greater than tangential (i.e. over 90 deg. in respect to a radial line to the point of departure) causes a certain amount of parasitical power loss via conflicting air streams (and thus is not preferred). An angle of plus or minus 20° is disclosed, as is a radial displacement 57 of plus 3 minus 1.5 inches (in a 30" deck), both taken in respect to the tangent 56 (see FIG. 2). In general the greater the radial displacement, the lesser the angle should be and the higher the auxiliary air pressure must be (and vice-versa).

The pressurized air can be provided by any motor driven fan, either integral with the mower deck or separate therefrom. For example, a small separate blower mounted above the mower deck and driven by a belt would be appropriate in units where the size and complexity of an integral fan causes design compromises such as multi-spindle side by side mower decks.

The particular pressure differential device disclosed is a radial fan 15 formed integrally with the spindle 60 of the rotary blade 52 in a confined space 58 on the underside of the top 55 of the mower deck. It is preferred that the space 58 be created through the addition of a supplemental piece 61 which is separately bolted to the bottom of the mower deck 50 so as to not disturb the integrity of the top 55 of the mower deck, most particularly at the critical location of the mounting of the spindle 60.

In that the particular pressure differential device disclosed is radial fan 15, the supplemental piece 61 is mounted off center in respect to the axis of rotation of the radial fan so as to provide a increasing cross section generally spiraling air passage or duct 65 surrounding the radial fan. The smallest cross-section 62 of this air passage 65 is located at or slightly downward of the critical trailing edge 54 of the discharge chute with the longitudinal axis of the air passage or duct running through the trailing edge of the discharge chute. The fan opening 66 is located near to the discharge chute directed tangentially substantially towards or slightly upstream of the trailing edge 54 of the discharge chute 51. In this respect it is noted that the minimum diameter cross sectional area 62 encourages the flow of air through the fan opening 66 by creating an air restriction downstream of the fan opening. Further, the generally spiraling air passage 65 produces a smooth laminar flow of air out of the fan opening 66, thus maximizing the efficiency of the air flow at this particular location.

In the particular embodiment disclosed, since the fan is a radial fan 15, it obtains its source of air through a series of holes 70 provided in the top 55 of the mower deck nearest the central axis of rotation of the radial fan. These holes 70 allow for the radial fan to pull air therefrom and thence outward, thus pressurizing the air in the increasing cross section spiraling air passage 65.

The holes 70 are themselves of a unique configuration so as to maximize deck strength while reducing manufacturing complexity. In specific, in the normal mowing deck the spindle is mounted in a central circular hole having an inner diameter only slightly more than the outer diameter of the spindle.

Note that with differing spindles the number and shape of the cloverleaf would vary. While it is technically possible for one to merely enlarge the central hole or add additional surrounding holes to provide a source of air for the fan 15, these both reduce the strength of the deck as well as, especially for the former, increasing the size, cost and complexity of the spindle (which now has to be self supporting over a longer distance than otherwise). In contrast in the present invention the hole 70 is of cloverleaf 72 shape complementing the four support arms of the spindle 60. The edges of the cloverleaf 72 are folded (down preferably) so as to create reinforcing flanges—thus, stiffening the deck at this critical location (the hole shape would vary dependent on the spindle). This pattern allows the drive spindle 60 to remain the same size as in a conventional deck without compromising the strength of the unit while still providing the needed air passage. By having the spindle in such a location, the air passing over it also cools the critical bearings and keeps the belt area cleaner than otherwise.

Although the invention has been described as preferred embodiment in a certain degree of particularity, it is understood that numerous changes can be made without deviating from the invention as hereinafter claimed.

We claim:

1. In a rotary mower deck having a rotary blade causing an air flow through a discharge chute with a trailing edge, the improvement comprising a source of additional pressurized air and means to direct said pressurized air towards the trailing edge of the discharge chute, said means to direct said additional pressurized air includes an air passage constituting a duct, said duct having an end opening, said duct having a longitudinal axis, and said longitudinal axis of said duct substantially running through said trailing edge of said discharge chute.

2. The improvement of claim 1 characterized in that said source of additional pressurized air includes a mower driven fan.

3. The improvement of claim 2 wherein the mower deck includes a blade spindle driven by a mower and characterized in that said mower driver fan is connected to the blade spindle.

4. The improvement of claim 1 wherein the mower deck includes a blade rotating in a direction towards the trailing edge of the discharge chute and characterized in that said means to direct said additional pressurized air directs air in the same direction as the blade.

5. The improvement of claim 1 characterized in that said mower driver fan is located in said duct.

6. The improvement of claim 5 wherein the blade spindle rotates in a direction and characterized in that said duct has a cross-section, and said cross section increasing in the direction of rotation of the blade spindle to the trailing edge of the discharge chute.

7. The improvement of claim 2 wherein the mower deck has a top surface and characterized by the addition of holes in the top surface, and in that said fan draws air through said holes in the top surface.

8. In a rotary mower deck having a rotary blade causing an air flow through a discharge chute with a trailing edge, the improvement comprising a source of additional pressurized air, means to direct said additional pressurized air towards the trailing edge of the discharge chute, said source of additional pressurized air including a mower driven fan, said means to direct said additional pressurized air includes an air passage constituting a duct, said duct having an end opening, said duct having a longitudinal axis, and said longitudinal axis of said duct substantially running through said trailing edge of said discharge chute, and said mower driven fan located in said duct.

9. The improvement of claim 8 wherein the blade spindle rotates in a direction and characterized in that said duct has a lateral cross-section, and said lateral cross-section increasing in the direction of rotation of said blade spindle to said trailing edge of said discharge chute.

10. The improvement of claim 8 wherein the mower deck has a top surface and characterized by the addition of holes in the top surface, and in that said fan drawing air through said holes in the top surface.

11. In a rotary mower deck having a rotary blade causing an air flow through a discharge chute with a trailing edge, the improvement comprising a source of additional pressurized air, means to direct said additional pressurized air towards the trailing edge of the discharge chute, said source of additional pressurized air including a mower driven fan, said mower driven fan being connected to the blade spindle, said mower driven fan being located in an air passage constituting a duct, said duct having an end opening, said duct having a longitudinal axis, said longitudinal axis of said duct substantially running through the trailing edge of the discharge chute, said duct having a lateral width cross-section, said lateral width cross section increasing in the direction of rotation of the blade spindle to the trailing edge of the discharge chute, and the mower deck having a top surface, holes in said top surface of said mower deck, and said fan drawing air through said holes in said top surface.

* * * * *